June 23, 1970     W. B. HART     3,516,361

ELECTROMAGNETICALLY-PROPELLED VEHICLE

Filed Sept. 5, 1967     4 Sheets-Sheet 1

INVENTOR
W. B. HART
BY
Cameron, Kerkam & Sutton
ATTORNEYS

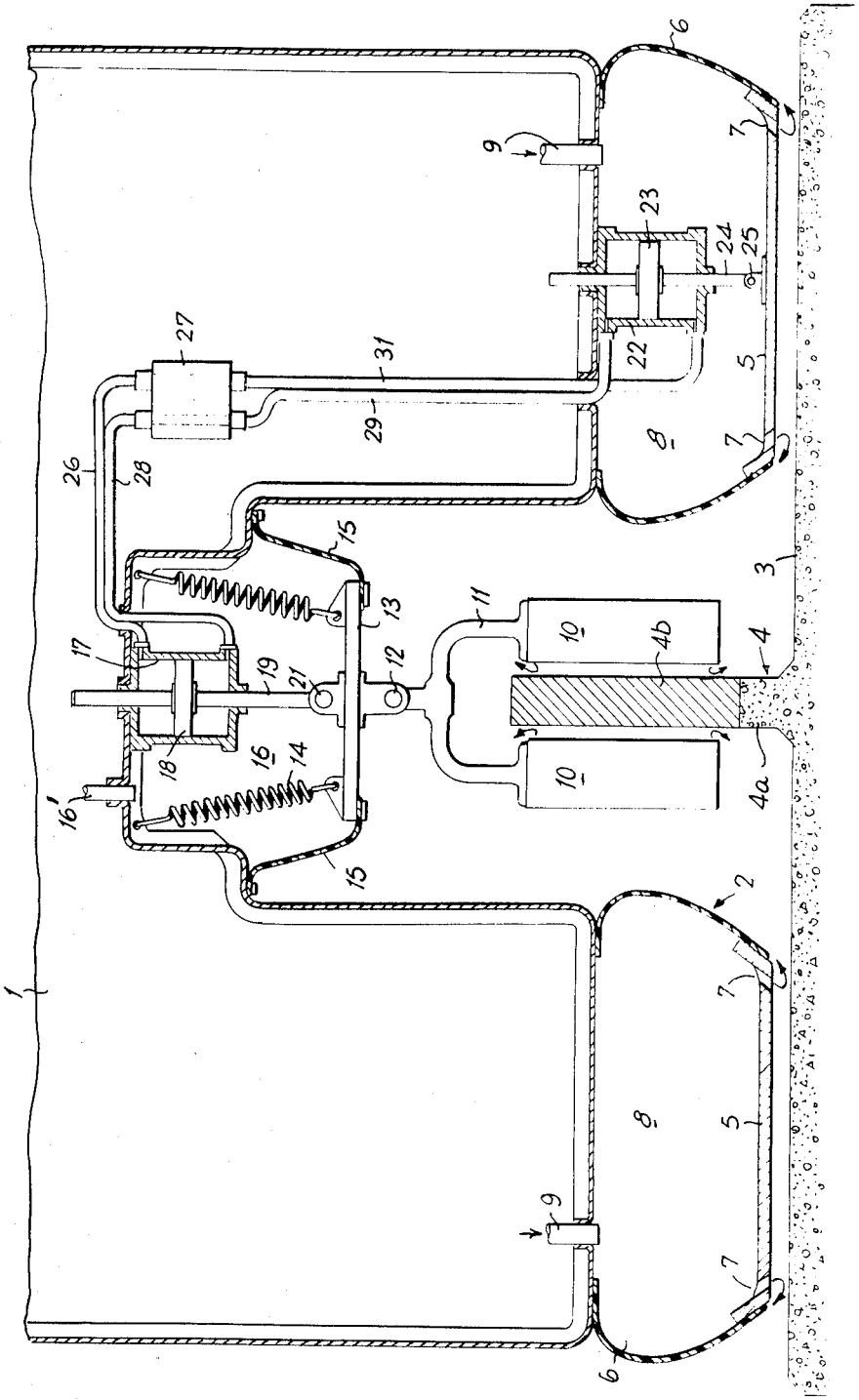

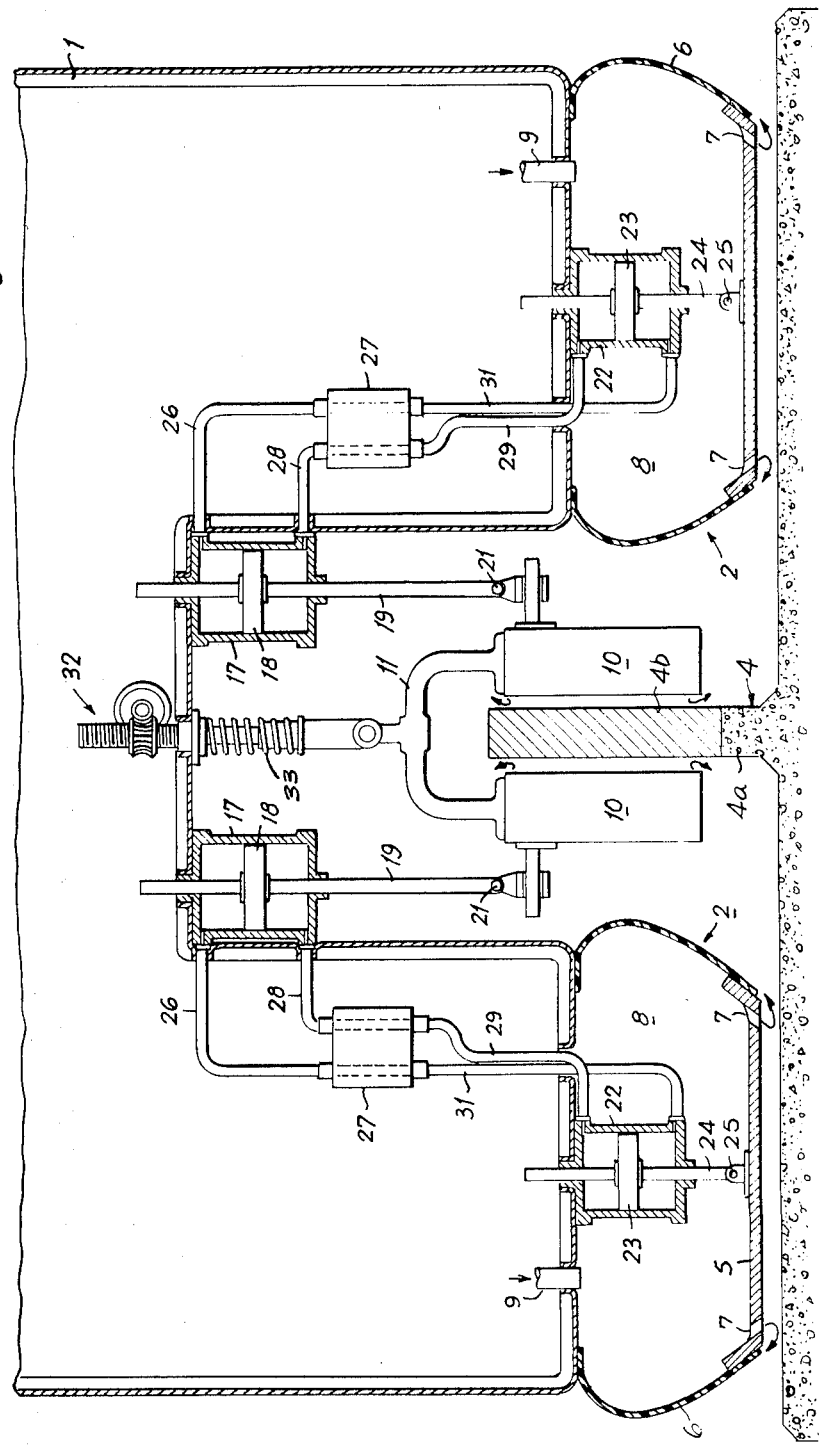

June 23, 1970 W. B. HART 3,516,361
ELECTROMAGNETICALLY-PROPELLED VEHICLE
Filed Sept. 5, 1967 4 Sheets-Sheet 4

INVENTOR
W. B. HART
BY
Cameron, Kerkam & Sutton
ATTORNEYS

United States Patent Office 3,516,361
Patented June 23, 1970

3,516,361
ELECTROMAGNETICALLY-PROPELLED VEHICLE
William Barrie Hart, Southampton, England, assignor to Hovercraft Development Limited, London, England, a British company
Filed Sept. 5, 1967, Ser. No. 665,323
Claims priority, application Great Britain, Sept. 6, 1966, 39,891/66
Int. Cl. B60v 3/04
U.S. Cl. 104—23     12 Claims

ABSTRACT OF THE DISCLOSURE

An air-cushion supported vehicle for operation on a prepared track is propelled along the track by a linear motor propulsion unit comprising a linear motor rail attached to the track so as to provide the "rotor" of the unit and "stator" windings carried by the vehicle body. At high speeds the vehicle tends not to follow small changes in direction of the track. In order, therefore, to avoid unwanted variations in vehicle-propelling force and to avoid the need to provide excess linear motor rail material, which would otherwise be required, by reason of relative movement between the motor rail and the stator, the vehicle is provided with automatic means for adjusting the position of the stator relative to the rail.

Figure 1:
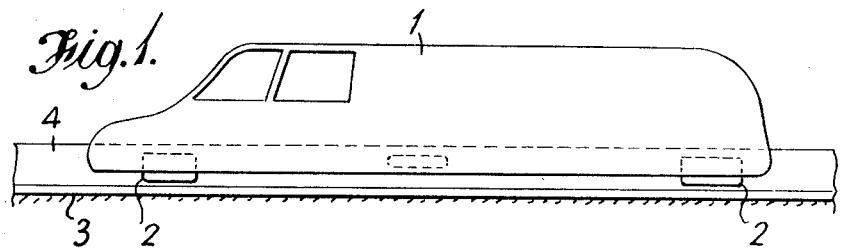

The adjusting means may comprise an air-cushion formed between the stator and the rail or track or it may comprise an actuator responsive to changes in the vehicle-supporting cushion.

---

This invention relates to electromagnetically-propelled vehicles and is concerned with electromagnetically-propelled gas-cushion vehicles, that is to say, electromagnetically-propelled vehicles which travel along a prepared track and are supported thereon, at least in part, by a cushion of pressurised gas formed and contained between the vehicle body and the track. The vehicle-propelling means comprise a linear induction motor formed by a "stator" structure carried by the vehicle body and which comprises a series of linear motor windings through which electric current is passed to produce a magnetic field, and a linear motor rail or "rotor" carried by the track whereby a vehicle-propelling force is generated in the manner described in the article appearing in the "New Scientist" (No. 255), Oct. 5, 1961, pages 42 to 45. Such a vehicle also carries at least one gas-cushion assembly or "pad" and means for forming the vehicle-supporting gas-cushion between the cushion assembly and the track.

Such vehicles are intended to travel at a considerable speed, for example, speeds around 200 m.p.h., and at such speeds the vehicle tends not to follow small changes in direction of the track. The gas-cushion assembly may therefore include suspension means which accommodates at least some of the changes in direction of the track by movement of the assembly relative to the track. However, to avoid unwanted variations in the vehicle-propelling force as the stator structure moves away from the motor rail and without having to provide excess rail material, the stator structure should be maintained at a substantially constant position relative to the linear motor rail, and it is an object of this invention to provide a vehicle in which the stator structure tends to follow small changes in direction of the rail.

The present invention provides an electromagnetically-propelled gas-cushion vehicle which, in operation, is supported, at least in part, by a gas-cushion formed between a prepared track on which the vehicle travels and a cushion assembly movably attached to the vehicle body, wherein the vehicle-propelling means include a stator structure carried by the vehicle body so as to be movable relative thereto, and a linear motor rail carried by the track, the vehicle being provided with means for adjusting the position of the stator structure relative to the rail and in a direction across the face of the rail independently of relative movement between the vehicle body and the track.

Where the linear motor rail is disposed substantially vertically the stator structure is adjustable in a substantially vertical direction and where the rail is disposed laterally the stator structure is adjustable in a lateral direction.

Means may be provided for forming a cushion of pressurised gas between the stator structure and the rail so as to maintain the stator structure at a substantially constant distance from the rail, for example, as described in Pat. No. 3,460,485.

Where lateral adjustment of the stator structure is required the latter may be adjusted to respond to lateral movement of a cushion assembly carried by the vehicle body and adapted to guide the vehicle along its track.

The means for adjusting the position of the stator structure may include means sensitive to relative movement between the stator structure and the track, to relative movement between the stator structure and the linear motor rail, to relative movement between the vehicle body and the track or to relative movement between the vehicle body and the cushion assembly.

Figure 2:
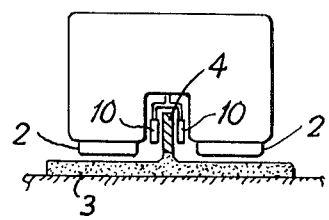

Embodiments of the present invention will now be described by way of example with reference to the accompanying drawings of which:

FIG. 1 is a diagrammatic side view of an electromagnetically-propelled vehicle and the track along which it travels, FIG. 2 is a diagrammatic rear end view of the vehicle and track, FIG. 3 is a diagrammatic rear end view to an enlarged scale showing compensating means according to one embodiment, FIG. 4 is a similar view to FIG. 3 but a modification thereof, and FIGS. 5 to 8 are views similar to that of FIG. 3 but illustrate different embodiments of the invention.

Referring first to FIGS. 1 to 3, an electromagnetically-propelled gas-cushion vehicle travelling on a prepared track includes a vehicle body 1 carrying four air-cushion assemblies or pads 2. The prepared track has a cross-section of inverted T-shape with a horizontal portion 3 and a central vertical portion 4. The portion 3 is of concrete and the portion 4 has a lower part 4a of concrete and an upper part 4b of aluminium, the part 4b serving as a linear motor rail. Two of the cushion assemblies 2 are located adjacent the front end of the vehicle on opposite sides of the vertical part 4 and the other two cushion assemblies 2 are located adjacent the rear end of the vehicle on opposite sides of the vertical part 4.

Each cushion assembly 2 includes (see FIG. 3) a cushion member or base 5 movably attached to the vehicle body 1 by a flexible wall 6 and each cushion member 5 has a peripheral slot 7 formed in it. The cushion member 5, flexible wall 6 and vehicle body 1 form a chamber 8 into which air is passed through a pipe 9 from an air compressor (not shown) carried by the vehicle body 1. Air under pressure passes from the chamber 8 through the peripheral slot 7 in the form of inwardly-directed air-curtains which form and contain a cushion of air of substantially constant thickness between the cushion member 5 and the horizontal part 3 of the track, the four air-cushions supporting the weight of the vehicle. The flexible walls 6 and chambers 8 act as suspension means which accommodate at least some of the vertical undulations of the track.

The vehicle body 1 may carry further air-cushion assemblies (not shown) which each form an air-cushion between a cushion member and the vertical part 4 of the track, the assemblies being arranged in pairs, one on one side and the other on the other side of the vertical part 4 to stabilise the vehicle in a lateral sense. These further air-cushion assemblies are not shown in FIGS. 1 to 3, but the arrangement will be understood after reading the description relating to the arrangement of FIG. 5.

The vehicle carries two linear motor "stator" structures 10, one on each side of the linear motor rail portion 4b of the vertical part 4 of the track. The structures 10 are rigidly secured to a yoke 11 pivotally connected at 12 to a cross member 13 suspended from the vehicle body 1 by two tension springs 14. The cross member 13 is connected to the vehicle body 1 by a flexible wall 15 and the cross member 13, flexible wall 15 and the vehicle body 1 form a chamber 16 into which air is passed through a pipe 16′ from the air compressor housed in the vehicle body 1. The springs 14 are located in the chamber 16. An upright cylinder 17 is also located in the chamber 16 and is secured to the body 1. A double-acting piston 18 is slidably located in the cylinder 17 and carries a piston rod 19 which projects from the lower end of the cylinder 17 and is pivotally connected at 21 to the cross member 13. The springs 14 carry substantially all the weight of the stator structures 10.

In one of the cushion assemblies, an upright-disposed cylinder 22 is located in the chamber 8 and is secured to the vehicle body 1. A double-acting piston 23 is slidably located in the cylinder 22 and carries a piston rod 24 which projects from the lower end of the cylinder 22 and is pivotally connected at 25 to the cushion member 5.

The upper part of the cylinder 17 is connected by a pipe 26 to a valve assembly 27 and the lower part of the cylinder 17 is connected to the valve assembly 27 by a pipe 28. The upper part of the cylinder 22 is connected to the valve assembly 27 by a pipe 29 and the lower part of the cylinder 22 is connected to the valve assembly 27 by a pipe 31. The cylinders 17 and 22 and pipes 26, 28, 29 and 31 are filled with hydraulic fluid. Components 11, 12, 13, 17, 18 and 19 provide fluid operated means for moving the stator structures 10 in response to changes in hydraulic fluid pressure and components 5, 22, 23, 24 and 25 provide converter means for converting changes in cushion pressure into changes in hydraulic pressure in the pipes 26, 28, 29, 31.

Before compressed air is supplied to the chambers 8 of the cushion assemblies 2 and to the chamber 16, the cushion members 5 rest on the horizontal part 3 of the track and the flexible walls 6 are slack, the vehicle body 1 being supported in a manner not shown, for example, by wheels. The piston 23 will then be at the upper end of the cylinder 22 and the springs 14 will be holding the stator structures in a raised position relative to the vehicle body 1, with the piston 18 at the top of the cylinder 17. The valve assembly 27 will, at the same time, be in a condition in which the pipe 29 is connected to the pipe 31 and the pipe 26 is connected to the pipe 28.

To generate the air-cushions air under pressure is supplied to the chambers 8 to inflate the flexible walls 6, thus raising the vehicle body 1 relative to the cushion members 5 and causing the piston 23 to move approximately halfway down the cylinder 22 so that fluid passes from one side of the piston 23 to the other through pipe 31, valve assembly 27 and pipe 29. Air then escapes from the chambers 8 through the peripheral slots 7 to form and then maintain the air-cushions, the cushion members 5 being caused to rise a distance above the horizontal part 3 of the track which is smaller than the vertical distance previously moved by the vehicle body 1 when the flexible walls 6 are inflated.

Air under pressure is then supplied through the pipe 16′ to the chamber 16 so as to inflate the flexible wall 15 and move the stator structures 10 downwardly relative to the vehicle body 1 until the stator structures 10 are correctly positioned relative to the linear motor portion 4b of the track part 4. This is done by the piston 18 passing fluid from one side of it to the other through pipe 28, valve assembly 27 and pipe 26. (The valve assembly 27 may include a hydraulic pump, with appropriate connections, which is operable to assist this adjustment of the stator structures 10.) The valve assembly 27 is then operated, automatically or manually, to place the pipe 26 in communication with the pipe 31 and to place the pipe 28 in communication with the pipe 29. The stator structures 10 can then be energised so as to propel the vehicle along the track.

While the vehicle is in operation travelling in a forward direction, vertical undulations of the track are at least partly absorbed by movement of the cushion members 5 towards the body 1 and consequent flexing of the flexible wall 6 such that only a much smaller vertical movement is imparted to the body 1. This relative movement between the cushion members 5 and the track produces a movement of the piston 23 in the cylinder 22 and the displacement of fluid by the piston produces a corresponding movement of the piston 18 in the cylinder 17. For example, an upward movement of the piston 23 (caused by an upward part of track undulation) displaces fluid into pipes 29 and 28 with consequent upward movement of the piston 18, fluid being displaced by piston 18 into the pipes 26 and 31 and thus back to the cylinder 22. Thus, the position of each stator structure 10 is adjusted in a direction across the face of the linear motor rail 4b, i.e. substantially vertically in accordance with vertical track undulations. The relative positions of the stator structures 10 and the linear rail 4b are therefore maintained substantially constant and the efficiency of the linear motor propulsion system is therefore preserved without having to provide the linear motor rail with excess height. It will be appreciated that the positions of the stator structures 10 are adjusted independently of relative movement between the vehicle body 1 and track 3, 4.

The pivotal connections 12, 21 and 25 accommodate rolling movement of the body 1 relative to the track. Each stator structure 10 may be maintained at a substantially constant distance from the vertical track part 4 by an air-cushion, for example, as described fully in Pat. No. 3,460,485 and briefly hereinafter with reference to FIG. 6. The source of air may be the source which supplies air to the cushion assemblies 2; alternatively, the stator structure assembly may carry its own source.

FIG. 4 shows a second embodiment in which the stator structures 10 are adjusted in a vertical direction by two compensating means, one of which is responsive to vertical movement of a cushion member 5 on one side of the vertical part 4 of the track, and the other of which is responsive to vertical movement of a cushion member 5 on the opposite side of the vertical part 4 of the track. This arrangement is responsive to rolling movement of the vehicle body as well as linear vertical movement. Initially, the stator structures 10 are vertically adjusted by a suitable adjusting means 32 acting on the yoke 11 through a spring 33.

Alternatively, or additionally, the stator structures 10 may be adjustable in a lateral sense by compensating means responsive to lateral movement of a laterally-guiding gas-cushion assembly. Such compensating means may be similar to that shown in FIG. 5 or FIG. 6.

Figure 5:
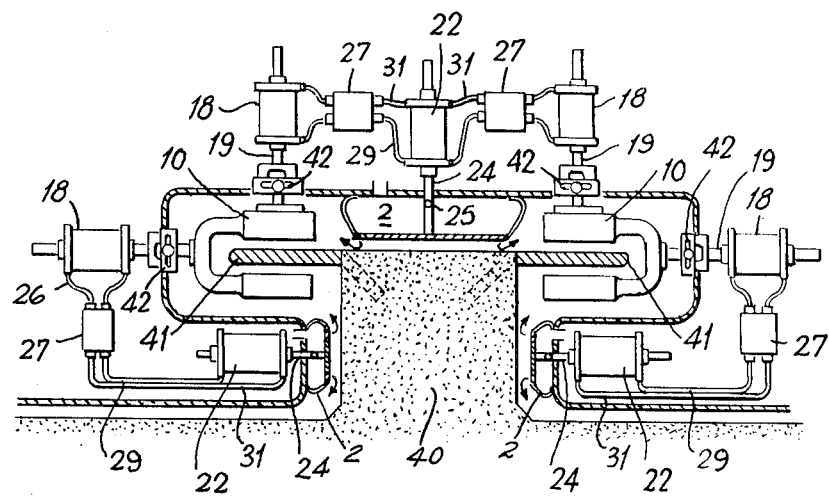

With reference to FIG. 5, in arrangements wherein the vehicle is propelled by electromagnetic means which include linear motor rails extending laterally away from a prepared track, the stator structures may be adjustable vertically in order to prevent them contacting the linear motor rails and also adjustable laterally in order to prevent them contacting the track.

As shown in FIG. 5, the track 40 is of rectangular section and the vehicle is supported and guided by air-cushions formed and contained between cushion assemblies 2 disposed above and on each side of the track 40. Projecting laterally from the top surface of the track 40 and disposed flush therewith are two aluminium linear motor rails 41. The piston rods 19 are of two-part construction, the parts being connected to each other by sliding pin and slot assemblies 42 which allow movement of the stator structures normal to the axes of the piston rods.

Figure 6:
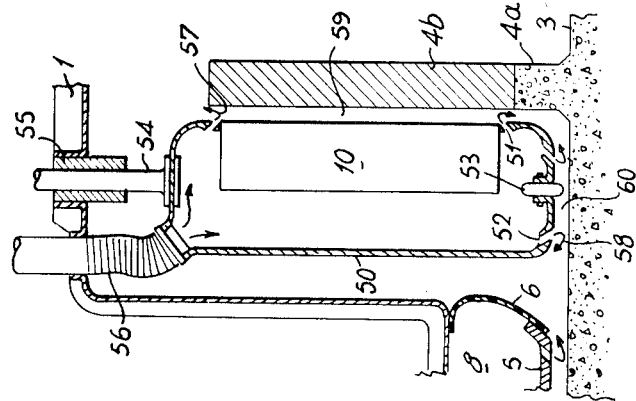

FIG. 6 illustrates an arrangement wherein the position of a stator structure 10 is adjusted by (air-cushion) means sensitive to relative movement between the stator structure and the track 3, 4.

With reference to the figure, each stator structure 10 is enclosed in a shell 50 which defines, with the inner surface of the structure, a peripheral nozzle 51. The bottom of the shell 50 is formed with a peripheral slot which defines an annular nozzle 52. That part of the shell 50 within the nozzle 52 carries a wheel 53 rotatable about a horizontal axis. The top of the shell 50 carries an upright-disposed rod 54 which is slidably located by a guide-bearing 55 attached to the vehicle body 1. A flexible air supply duct 56 connects the interior of the shell 50 with with an air compressor (not shown) housed within the vehicle body 1.

In operation pressurised air supplied by the duct 56 issues from the nozzles 51, 52, in the form of air-curtains 57, 58. The air curtains 57, 58 form and contain air-cushions 59, 60 respectively. The air-cushions 59, 60 maintain substantially constant lateral and vertical clearances between the stator structure 10 and track 3, 4, and cause the former to "follow" the latter. Thus, in the case of the air-cushions 60, as the track part 3 rises and falls, the stator structure 10 rises and falls correspondingly, guided by the rod 54 and guide-bearing 55, so adjusting the position of the stator structure in the desired manner.

Figure 7:
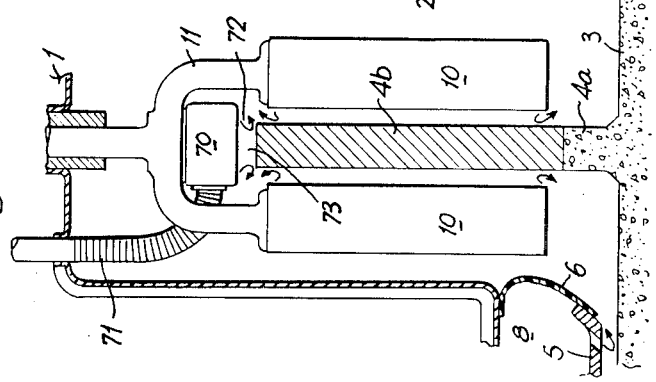

The wheel 53 maintains the stator structure 10 clear of the track part 3 in the absence of the cushion 60. FIG. 7 illustrates an arrangement where the position of a stator structure 10 is adjusted by (air-cushion) means sensitive to relative movement between the stator structure 10 and the linear motor rail 4b.

With reference to the figure the yoke 11 carries an air-cushion pad 70. The pad 70 is connected by means of a flexible duct 71 to an air compressor (not shown) carried within the vehicle body 1. The bottom of the pad 70 is perforated by an annular slot and air supplied to the pad by the duct 71 issues from the slot in the form of an air-curtain 72. The air-curtain 72 forms and contains an air-cushion 73 trapped between the pad 70 and the top edge of the linear motor rail 4b.

In a manner somewhat similar to the arrangement of FIG. 6, the air-cushion 73 causes the stator structure 10 to "follow" vertical undulations of the track 3, 4 and linear motor rail 4b.

Figure 8:
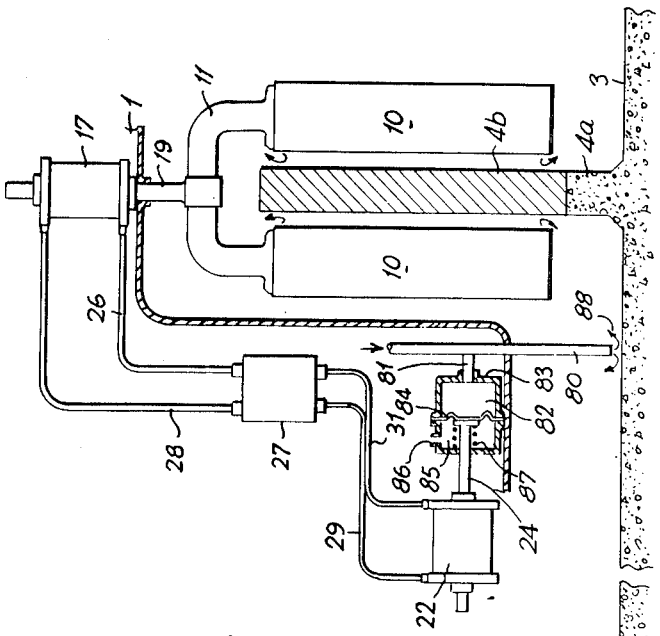

FIG. 8 illustrates an arrangement wherein the position of a stator structure 10 is adjusted by (actuating) means sensitive and responsive to relative movement between the vehicle body 1 and the track 3, 4.

With reference to FIG. 8, the vehicle body 1 carries a downwardly-depending probe 80 and air at substantially constant pressure is supplied to the upper end of the probe by a compressor (not shown) housed within the vehicle body. A branch 81 connects the probe 80 with an internal chamber 82 of a capsule 83 divided internally by a flexible diaphragm 84 so as to define the chamber 82 and a further chamber 85. Chamber 85 is open to atmosphere through an orifice 86 and the diaphragm 84 is connected to the piston rod 24 of a fluid piston unit 22. A compression spring 87 urges the diaphragm 84 toward the chamber 82.

As will be readily understood from reading the description relating to FIG. 3, lateral movement of the piston rod 24 will result in vertical movement of the piston rod 19 of the fluid piston unit 17, the latter rod being connected to the yoke 11 carrying the stator structures 10.

In operation, pressurised air is discharged from the bottom end of the probe 80 in the form of a jet 88 which impinges on the track part 3. Back pressure in the probe is sensed by the capsule 83 and the diaphragm takes up a position where it is subjected to the equal forces of the spring 87 and the back pressure.

As relative movement between the vehicle body 1 and the track 3, 4, takes place, the back pressure in the probe 80 varies accordingly and this variation results in lateral movement of the piston rod 24. Thus, if the clearance between the vehicle body 1 and the track part 3 increases, back pressure in the probe 80 falls and the spring 87 causes the piston rod 24 to move to the left. This movement of the piston rod 24 causes the piston rod 19 of the unit 17 to rise so as to lift the stator structures 10 upwardly to adjust its position relative to the linear motor rail 4b. A decrease in clearance between the vehicle body 1 and track part 3 causes the position of the stator structure 10 to be adjusted in the opposite direction. Thus, the positions of the stator structures 10 are adjusted so that they "follow" the linear motor rail 4b.

I claim:

1. An electromagnetically-propelled gas-cushion vehicle which, in operation, is supported, at least in part, by a gas-cushion formed between a prepared track on which the vehicle travels and a cushion assembly movably attached to the vehicle body wherein the vehicle-propelling means include a stator structure carried by the vehicle body and movable relative thereto and a linear motor rail carried by the track, the vehicle being provided with means for adjusting the position of the stator structure relative to the rail and the vehicle body in a direction across the face of the rail.

2. A vehicle as claimed in claim 1 wherein the position-adjusting means include means sensitive to relative movement between the stator structure and the track.

3. A vehicle as claimed in claim 1 wherein the position-adjusting means include means sensitive to relative movement between the stator structure and the linear motor rail.

4. A vehicle as claimed in claim 1 wherein the position-adjusting means include means sensitive to relative movement between the vehicle body and the track.

5. A vehicle as claimed in claim 1 wherein the position-adjusting means include means sensitive to relative movement between the vehicle body and the cushion assembly.

6. A vehicle as claimed in claim 1 including fluid-operated actuator means for moving the stator structure in response to changes in fluid pressure, and converter means sensitive to changes in pressure of the vehicle-supporting gas-cushion and operable to convert said gas-pressure changes into changes in actuator-fluid pressure.

7. A vehicle as claimed in claim 6 wherein both the actuator means and the converter means include double-acting pistons slidably located in cylinders and conduit means connecting opposite sides of the piston of the actuator means with opposite sides of the piston of the converter means, and further including means for moving the piston of the converter means in accordance with changes in cushion pressure whereby the piston of the actuator means is moved correspondingly.

8. A vehicle as claimed in claim 2 including means for forming a stator-supporting gas-cushion between the stator structure and a support surface of the track.

9. A vehicle as claimed in claim 3 including means for forming a stator-supporting gas-cushion between the stator structure and a support surface of the linear motor rail.

10. A vehicle as claimed in claim 4 including probe means for discharging a flow of pressurised fluid from the vehicle body on to the track, whereby the pressure of the fluid flow varies as the vehicle body and track move relative to each other, and means responsive to the pressure changes of said flow and operable to move the stator structure in accordance with said pressure changes.

11. A vehicle as claimed in claim 1 provided with means for forming a gas-cushion between a guide surface of the track and the vehicle body whereby the vehicle is guided laterally.

12. A vehicle as claimed in claim 1 in combination with a prepared track for operation thereon.

References Cited

UNITED STATES PATENTS 3,381,627  5/1968  Hart et al. _____ 104—23
3,385,228  5/1968  Chung _____ 104—134

A. H. FARRELL, Primary Examiner